June 21, 1949.  C. H. ALLEN ET AL  2,473,775
DECORATIVE COVER FOR TELEPHONE DESK SETS
Filed Aug. 26, 1946
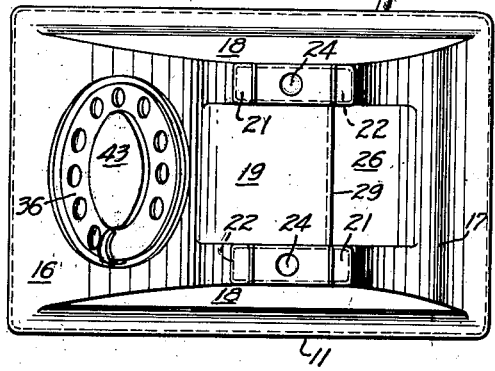
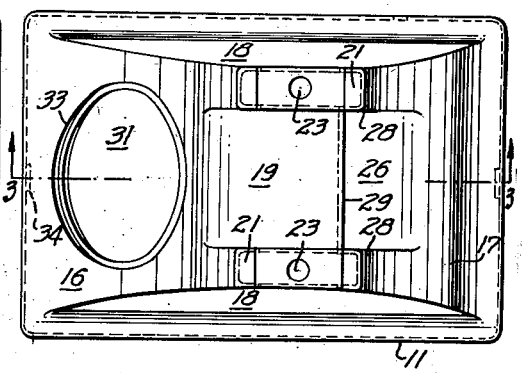
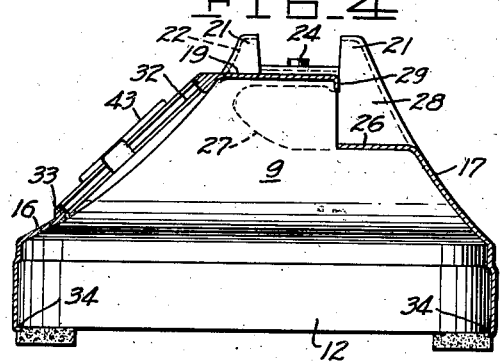
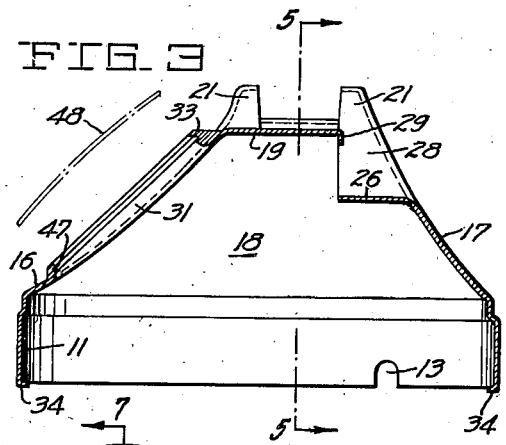
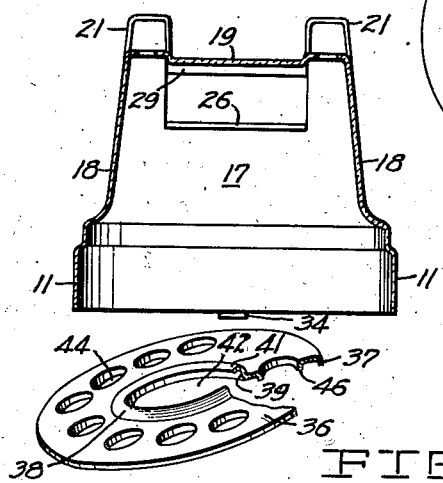
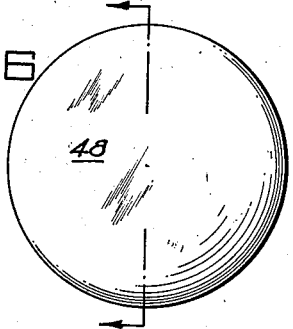
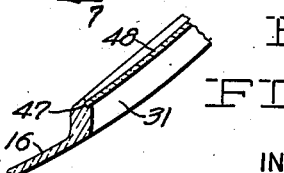
INVENTORS
CALVIN H. ALLEN
MARY E. ALLEN
BY Joseph B. Gardner
their atty.

Patented June 21, 1949

2,473,775

UNITED STATES PATENT OFFICE 2,473,775

DECORATIVE COVER FOR TELEPHONE DESK SETS

Calvin H. Allen and Mary E. Allen, Oakland, Calif., assignors to Colorphone, Inc.

Application August 26, 1946, Serial No. 693,123

7 Claims. (Cl. 179—179)

This invention relates to overlay coverings used in disguising the usual outward appearance of articles.

An object of the invention is to provide an overlay cover particularly adapted for use with telephone base units.

Another object of the invention is to provide an overlay cover, for conventional dial-equipped telephone base units, which comprises a one-piece member capable of secure enveloping engagement with the base unit as the result of a single unidirectional movement in bringing the cover and unit together.

A further object of the invention is to provide a thin overlay covering for telephone base units which when mounted in place will in no way interfere with the efficiency of operation of the telephone.

Still another object of the invention is to provide a simple and effect latching means for securing the overlay cover of our invention on a telephone base unit and providing for ready release of the cover when desired.

Yet another object of the invention is to provide a cover of the character described equipped to receive a closure disk for the dial clearance aperture when the overlay cover is employed with a manual exchange instrument not equipped with a dialing mechanism.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a top plan view showing the overlay cover of our invention associated with the base unit of the so-called portable hand type of automatic dial instrument.

Figure 2 is a top plan view of the overlay cover alone.

Figure 3 is a vertical sectional view taken in the plane indicated by the line 3—3 of Figure 2.

Figure 4 is a vertical sectional view of the overlay cover, similar to Figure 3, but illustrating the application of the cover to the telephone base unit, the latter being shown in side elevation since the internal structure thereof forms no part of this invention.

Figure 5 is a vertical sectional view taken in the plane indicated by the line 5—5 of Figure 3.

Figure 6 is a top plan view, to an enlarged scale, of the dial aperture closure disk.

Figure 7 is a vertical sectional view taken in the plane indicated by the line 7—7 of Figure 6.

Figure 8 is an enlarged vertical sectional view of a portion of the structure bordering the dial aperture and showing the closure disk in place within the aperture.

Figure 9 is a perspective view, partly in vertical section, of the code rotor cover disk.

The standard telephone base unit, while possessing an external design which is quite pleasing to the eye, is invariably supplied with a black surface finish incapable of blending harmoniously with the color scheme of the average room in which the instrument may be located. In order to render the telephone less prominent and attention-distracting in the room setting, decorators usually resort to concealment of the instrument by covering it with a decorated box-like lid or a fabric-covered form designed to simulate a doll or the like. These devices, while they produce the primarily desired result, add a secondary undesired result in that they must be removed from the telephone when the latter is to be used and must be replaced after the call is completed. Furthermore, such devices, due to frequent handling are subject to soiling and must be renewed or renovated after relatively short intervals.

We have provided a decorative cover, for the base units of telephones, which may be produced in a wide variety of colors permitting approximate matching thereof with a given color scheme. Referring to Figure 4, we have illustrated the base unit 9 of a standard handset telephone instrument. We provide a molded plastic shell, of comparatively thin wall thickness, which encloses the base unit and which very closely conforms to the outer surface contour thereof so as to substantially conceal from normal view all of the underlying surface portions of the base unit. This shell comprises a vertical skirt portion 11 overlying the marginal rim 12 of the base and provided with a downwardly opening notch 13 fitting over the conductor cord 14 which extends, as shown, from the base unit. A front wall 16, rear wall 17 and side walls 18 are all formed integrally with the skirt portion 11 and converge upwardly in edgewise joined relationship and in substantially contiguous relationship with the upper curvatures of the base unit to terminate in an integral top wall 19 overlying the upper flat surface of the base unit. Rising from opposite corners of the top wall 19 are hollow caps or protuberances 21 which fit over the spurs 22 provided to form a cradle for the transmitter and receiver unit. Apertures 23 provided in the portions of the top wall between opposed caps 21 are for the purpose of clearing the switch buttons 24 and the rear wall 17 has a U-shaped depressed portion therein comprising a bottom wall 26, extending into the finger recess 27 of the base unit, and side walls 28 continuing upwardly to merge with the sides of the rear caps 21. A lip 29 of the top wall 19 extends downwardly from the rear edge of the latter overlying the subjacent portion of the base unit so as to shield the latter portion from view.

Formed in the front wall 16 is a substantially circular aperture 31 for receiving the dial 32 and provided with a marginal rim 33 extending from the wall to a plane coinciding with the upper surface of the finger-hole or coding rotor of the dial. It will be seen that the shell conforms in outer shape with the base unit and has therein a cavity shaped substantially correspondingly to snugly fit the unit. Locking means for securing the cover shell on the base unit is provided in two or more lugs 34 extending inwardly from the bottom edge of the skirt 11 and positioned to underlie the bottom surface of the base unit so as to prevent vertical displacement of the latter and the cover shell. Functioning of the lugs 34 as latch elements is rendered possible due to the fact that there is considerable flexibility in the portions of the skirt 11 bearing the lugs so that when the cover shell is moved vertically downwardly into position over the base unit, the said portions of the skirt will be forcibly flexed outwardly by the projecting lugs as the latter slide downwardly across the rim 12 to thereafter snap into place below the base unit as the skirt portions resume their unflexed positions. Removal of the cover shell may be accomplished, if desired, by manually pressing the lugs outwardly so as to clear the sides of the base rim whereupon the shell may be lifted vertically from the base unit.

Although the cover shell of our invention is designed to enclose the major portion of the base unit surface area normally exposed to view, it cannot for practical reasons be expected to conceal the movable coding rotor of the dial. However, we provide for covering this part by furnishing, as shown in Figure 9, a comparatively thin cover disk 36 composed of similar material to that of the cover shell and sized to overlie and extend diametrically slightly beyond the periphery of the coding rotor, a downwardly extending rim bead 37 being provided on the disk for overlying and covering the rim portion of the rotor. Formed centrally of the disk 36 is a circular socket 38 bordered by a rim 39 having a lip 41 turned radially inwardly from the periphery thereof and defining an aperture 42. The socket 38 is provided to receive the circular center cap 43 of the rotor and is of such dimension that the cap will tightly engage in the socket and thus frictionally mount the disk on the rotor. A plurality of apertures 44, equivalent in number and position to those in the rotor, is provided in the disk and each aperture is bordered by an annular bead 46 entering the associated rotor aperture so that the rotor and disk are held together against relative rotational displacement.

Means is provided for conditioning the decorative cover of our invention for use with telephone instruments of the type illustrated which are not equipped with dial mechanisms. In the enlarged sectional view of Figure 8 it will be seen that we provide the dial aperature 31, adjacent its junction with the outer transaxial plane of the rim 33, with a counterbore 47 having its side wall extending inwardly from said plane of the rim in angularly divergent relationship with the axis of the aperture. A comparatively thin circular disk 48 of the same material as the shell and having a concave-convex cross-sectional contour is provided and sized to snugly fit into the counterbore 47 so as to provide a closure for the dial aperture. Securement of the disk in the aperture is effected by inserting the disk, as indicated in Figure 3, in outwardly convexed condition into the counterbore 47 and pressing inwardly on the center of the disk until the latter snaps into inwardly concave position whereupon the slight diametrical expansion occurring along the inner face of the disk due to the change in its cross-sectional form will hold it in the counterbore against dislodgement therefrom.

The decorative cover of our invention above described is designed for production in a relatively simple two-unit mold and for connection with the telephone base unit by the simple procedure of moving the cover shell unidirectionally into engagement with and overlying the base unit. In addition, the design is such that the identical outward appearance of the telephone instrument is maintained in the outward appearance of the shell and no unsightly screws or other such attachment devices are employed or are visible to mar the otherwise eye-pleasing contours of the instrument. Furthermore, since the cover of our invention is to be constructed of molded plastic, in which a wide range of colors and decorative effects are obtainable, it is possible to readily secure the proper color to blend with a given color scheme of a room or to quickly change the decorative color of the instrument without in any way adversely affecting the instrument or its operation, should such change be desirable to conform with an altered color scheme in the room or for any other reason.

We claim:

1. A decorative cover for a telephone base unit comprising a body having therein a cavity molded in substantial conformity with and to snugly receive the entire housing of said base unit, said body having therein recessed protuberances for receiving correspondingly shaped parts of the base unit housing and to provide a cradle for receiving a transmitter-receiver unit, said body further having therein an aperture registered with and through which the dial rotor of the base unit is exposed, a cover disk complementary with and overlying said dial rotor in coaxial relation with said body aperture, means for holding said body onto said base unit housing, and means carried by said cover disk and providing frictional engagement between said dial rotor and cover disk.

2. A decorative cover for a telephone base unit comprising a body having therein a cavity molded in substantial conformity with and to snugly receive the entire housing of said base unit, said body having therein recessed protuberances for receiving correspondingly shaped parts of the base unit housing and to provide a cradle for receiving a transmitter-receiver unit, said body further having therein an aperture registered with and through which a dial rotor may be exposed, means receivable in said aperture for closing the latter, means securing said body to said base unit, and means for attaching said cover disk to said dial rotor.

3. A decorative cover for a telephone base unit comprising a body having therein a cavity molded in substantial conformity with and to snugly receive the entire housing of said base unit, said body having therein recessed protuberances for receiving correspondingly shaped parts of the base unit housing and to provide a cradle for receiving a transmitter-receiver unit, said body further having therein a dial-receiving aperture provided with a coaxial counterbore opening outwardly of said body, a cover disk complementary with and overlying said dial rotor, means for frictionally securing said cover disk to said dial rotor, means for securing said cover disk and said dial rotor together against relative rotational displacement, and lugs carried by said body and overlying portions of said base unit for preventing relative displacement between said body and said base unit.

4. A decorative cover for a telephone base unit comprising a body having therein a cavity molded in substantial conformity with and to snugly receive the entire housing of said base unit, said body having therein recessed protuberances for receiving correspondingly shaped parts of the base unit housing and to provide a cradle for receiving a transmitter-receiver unit, said body further having therein a dial-receiving aperture provided with a coaxial counterbore opening outwardly of said body, a cover disk complementary with and overlying said dial rotor, means for frictionally securing said cover disk to said dial rotor, means for securing said cover disk and said dial rotor together against relative rotational displacement, and lugs carried by flexible portions of said body and positioned at the rim of said cavity for overlying and securing said base unit in said cavity.

5. A decorative cover for a telephone base unit comprising a body having therein a cavity molded in substantial conformity with and to snugly receive the entire housing of said base unit, said body having therein recessed protuberances for receiving correspondingly shaped parts of the base unit housing and to provide a cradle for receiving a transmitter-receiver unit, said body further having therein a dial-receiving aperture provided with a coaxial counter-bore opening outwardly of said body, a cover disk complementary with and overlying said dial rotor, means for frictionally securing said cover disk to said dial rotor, means for securing said cover disk and said dial rotor together against relative rotational displacement, and lugs carried by flexible portions of said body and positioned at the rim of said cavity for overlying and securing said base unit in said cavity, and said lugs being movable upon flexure of said flexible portions of said body from the positions thereof overlying said base unit whereby said body may be removed from said base unit.

6. A decorative cover for a telephone base unit provided with a dial rotor on one side and a finger receiving recess on the other side to enable lifting of said base unit with fingers comprising a thin walled body having therein a cavity molded in substantial conformity with and to snugly receive substantially the entire housing of said base unit which has opposed sides diverging from the upper to the lower portion thereof, said body also having therein recessed protuberances for receiving correspondingly shaped parts of the base unit housing which provide a cradle for receiving and resting a transmitter-receiver unit, said body further having therein a fingers-enterable aperture registering with said finger receiving recess whereby fingers may be inserted to lift said base unit having the cover superimposed thereover without dislodgement of the cover therefrom, said body still further having therein an aperture registered with and through which the dial rotor of the base unit is exposeable, and a cover disk complementary with and adapted to substantially cover said dial rotor in coaxial relation with said dial rotor aperture, which cover disk is secured to said dial rotor by frictionally engageable means.

7. A decorative cover for a telephone base unit provided with a dial rotor on one side and a finger receiving recess on the other side to thereby enable lifting of the unit with fingers comprising a substantially uniformly thin-walled hollow body superimposeable over the housing of said base unit, said body being in substantial conformity with and to snugly receive substantially the entire housing of said base unit, said body having therein recessed protuberances for receiving correspondingly shaped parts of the base unit which provide cradles for receiving and resting a transmitter-receiver unit which engages switch buttons located between said parts when so resting, and said body having therein apertures registering with and through which said switch buttons may protrude, a further aperture registering with and through which said dial rotor may be exposed, and a still further fingers-enterable aperture registering with said finger recess whereby fingers may be inserted to lift said base unit without dislodgement of the cover superimposed over said base unit.

CALVIN H. ALLEN.
MARY E. ALLEN.

REFERENCES CITED

The following references are of record in the file of this patent:

UNITED STATES PATENTS

| Number | Name | Date |
|---|---|---|
| 1,315,794 | Richards | Sept. 9, 1919 |
| 1,340,863 | Knight | May 18, 1920 |
| 1,863,130 | Swain | June 14, 1932 |
| 1,912,231 | Wandscheer | May 30, 1933 |
| 2,096,046 | Kuhn et al. | Oct. 19, 1937 |
| 2,200,810 | Sengebusch | May 14, 1940 |
| 2,244,918 | Obergfell | June 10, 1946 |
| 2,428,972 | Jacklu | Oct. 14, 1947 |
| 2,440,569 | Baldwin | Apr. 27, 1948 |